(12) United States Patent
Tsujii

(10) Patent No.: US 8,199,281 B2
(45) Date of Patent: Jun. 12, 2012

(54) BACKLIGHT OF LIQUID CRYSTAL DISPLAY DEVICE

(75) Inventor: Takayuki Tsujii, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 203 days.

(21) Appl. No.: 12/545,521

(22) Filed: Aug. 21, 2009

(65) Prior Publication Data

US 2010/0165252 A1 Jul. 1, 2010

(30) Foreign Application Priority Data

Dec. 29, 2008 (JP) ................. 2008-335638

(51) Int. Cl.
*G09F 13/08* (2006.01)
*G02F 1/1335* (2006.01)

(52) U.S. Cl. ......................... 349/65; 362/97.2
(58) Field of Classification Search .................... 349/65, 349/62; 362/97.1–97.3
See application file for complete search history.

(56) References Cited

U.S. PATENT DOCUMENTS

| | | | | |
|---|---|---|---|---|
| 2006/0239033 | A1* | 10/2006 | Jung et al. | 362/612 |
| 2007/0181555 | A1* | 8/2007 | Clough et al. | 219/216 |
| 2007/0247871 | A1* | 10/2007 | Yoo | 362/612 |
| 2007/0257680 | A1* | 11/2007 | Klijn et al. | 324/418 |
| 2008/0002429 | A1 | 1/2008 | Noba | |
| 2008/0205080 | A1* | 8/2008 | Erchak et al. | 362/613 |
| 2009/0027572 | A1* | 1/2009 | Kido et al. | 348/751 |
| 2009/0296026 | A1* | 12/2009 | Bae et al. | 349/65 |

FOREIGN PATENT DOCUMENTS

| | | |
|---|---|---|
| JP | 62-234133 | 10/1987 |
| JP | 2005-283829 | 10/2005 |
| JP | 2008-10291 | 1/2008 |

OTHER PUBLICATIONS esp@cenet patent abstract for Japanese Publication No. 62234133, Publication date Oct. 14, 1987 (1 page).
esp@cenet patent abstract for Japanese Publication No. 2005283829, Publication date Oct. 13, 2005 (1 page).
esp@cenet patent abstract for Japanese Publication No. 2008010291, Publication date Jan. 17, 2008 (1 page).

\* cited by examiner

*Primary Examiner* — Mark Robinson
*Assistant Examiner* — Michael Inadomi
(74) *Attorney, Agent, or Firm* — Osha • Liang LLP

(57) ABSTRACT

In a backlight of a liquid crystal display device, the screen of a liquid crystal panel is divided into a plurality of rectangular regions, an edge-light type light guide plate is provided corresponding to each of the rectangular regions, and a plurality of LEDs are provided on the end face of each edge-light type light guide plate. The brightness of the image displayed on each of the rectangular regions is obtained based on an image signal, and, based on the brightness, the brightness of the plurality of LEDs corresponding to each of the rectangular regions is controlled. Accordingly, the power consumption can be reduced as compared with the case where the entire liquid crystal panel is illuminated with uniform brightness. Furthermore, the edge-light type light guide plate is used to allow a decrease in number of the LEDs and the wiring arrangements.

1 Claim, 3 Drawing Sheets

BACKLIGHT OF LIQUID CRYSTAL DISPLAY DEVICE

BACKGROUND OF THE INVENTION

1. Field of the Invention

The present invention relates to a backlight of a liquid crystal display device, and particularly to a backlight applying transmissive light to a transmission-type liquid crystal panel provided in a liquid crystal display device.

2. Description of the Background Art

Conventionally, a cold-cathode tube and a light-emitting diode (LED) have been used as a light emitting source of the backlight for a liquid crystal television set. As an example of the backlight using an LED, a plurality of LEDs are arranged in a plurality of rows and columns on the backside of the liquid crystal panel and are sequentially lit on a time division basis (for example, see Japanese Patent Laying-Open No. 62-234133).

Furthermore, as another example of a backlight using an LED, an edge-light type light guide plate is provided on the backside of the liquid crystal panel, in which a plurality of LEDs are arranged on the end face of the light guide plate to apply the light of each of the plurality of LEDs through the entire surface of the light guide plate to the liquid crystal panel (for example, Japanese Patent Laying-Open Nos. 2005-283829 and 2008-010291).

However, in the conventional backlight using a cold-cathode tube, for example, even in the case where only a part of the image is bright while the remaining part thereof is dark, the entire liquid crystal panel needs to be uniformly illuminated, which poses a problem that the power is wasted.

Furthermore, the conventional backlight using a plurality of LEDs arranged in a plurality of rows and columns requires a large number of LEDs and wiring arrangements. This poses a problem that the device configuration increases in complexity.

Furthermore, in the conventional backlight using an edge-light type light guide plate and a plurality of LEDs, the entire liquid crystal panel needs to be uniformly illuminated as with the conventional backlight using a cold-cathode tube. This also poses a problem that the power is wasted.

SUMMARY OF THE INVENTION

Therefore, a main object of the present invention is to provide a backlight of a liquid crystal display device in which the device configuration is simplified and power consumption is reduced.

A backlight of a liquid crystal display device according to the present invention serves to apply transmissive light to a transmission-type liquid crystal panel provided in the liquid crystal display device, in which a screen of the liquid crystal panel is divided into a plurality of regions. The backlight includes a plurality of light emitting sources provided corresponding to the plurality of regions, respectively; a plurality of edge-light type light guide plates provided corresponding to the plurality of regions, respectively, each edge-light type light guide plate having a surface facing a corresponding one of the regions, having an end face on which light is incident from a corresponding one of the light emitting sources, and causing the light incident on the end face to emit from the surface; and a brightness control unit for obtaining a brightness of an image displayed on each of the regions based on an image signal and, based on the brightness, controlling a brightness of each of the light emitting sources corresponding to respective regions.

Preferably, the plurality of regions are arranged in a plurality of rows and a plurality of columns, the plurality of edge-light type light guide plates are provided corresponding to the plurality of regions, respectively, and arranged in the plurality of rows and the plurality of columns, and each of a plurality of light emitting sources in each of the plurality of columns is placed on one side of a corresponding one of the plurality of edge-light type light guide plates. The backlight further includes a plurality of substrates provided corresponding to the plurality of columns, respectively, each substrate having the plurality of light emitting sources on a corresponding one of the plurality of columns.

Further preferably, each of the plurality of light emitting sources includes a light-emitting diode.

In the backlight of the liquid crystal display device according to the present invention, the screen of the liquid crystal panel is divided into a plurality of regions, a light emitting source and an edge-light type light guide plate are provided corresponding to each of the regions, the brightness of the image displayed on each of the regions is obtained based on the image signal, and, based on the brightness, the brightness of each light emitting source is controlled. Therefore, since the brightness of the light emitting source is controlled for each region, the power consumption can be reduced as compared with the case where the entire liquid crystal panel is illuminated with uniform brightness. Furthermore, the edge-light type light guide plate is used to thereby allow a decrease in number of the light emitting sources and the wiring arrangements, and also allow simplification of the device configuration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
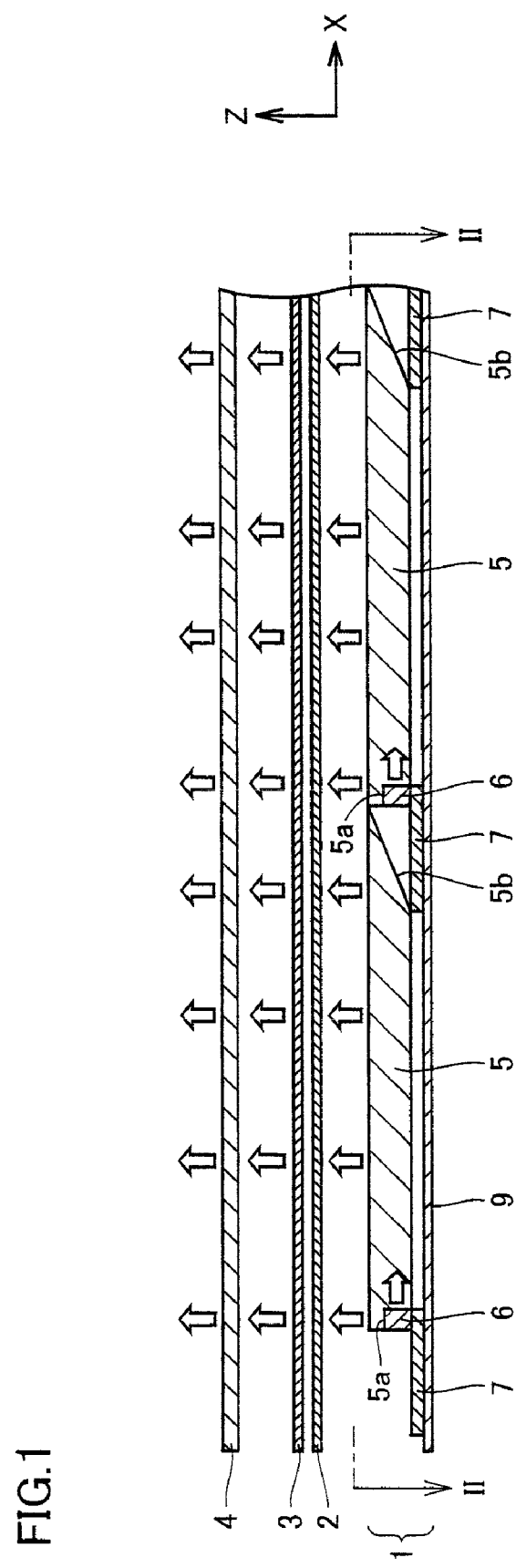
FIG. 1 is a cross-sectional view of a main part of a liquid crystal television set according to an embodiment of the present invention.
Figure 2:
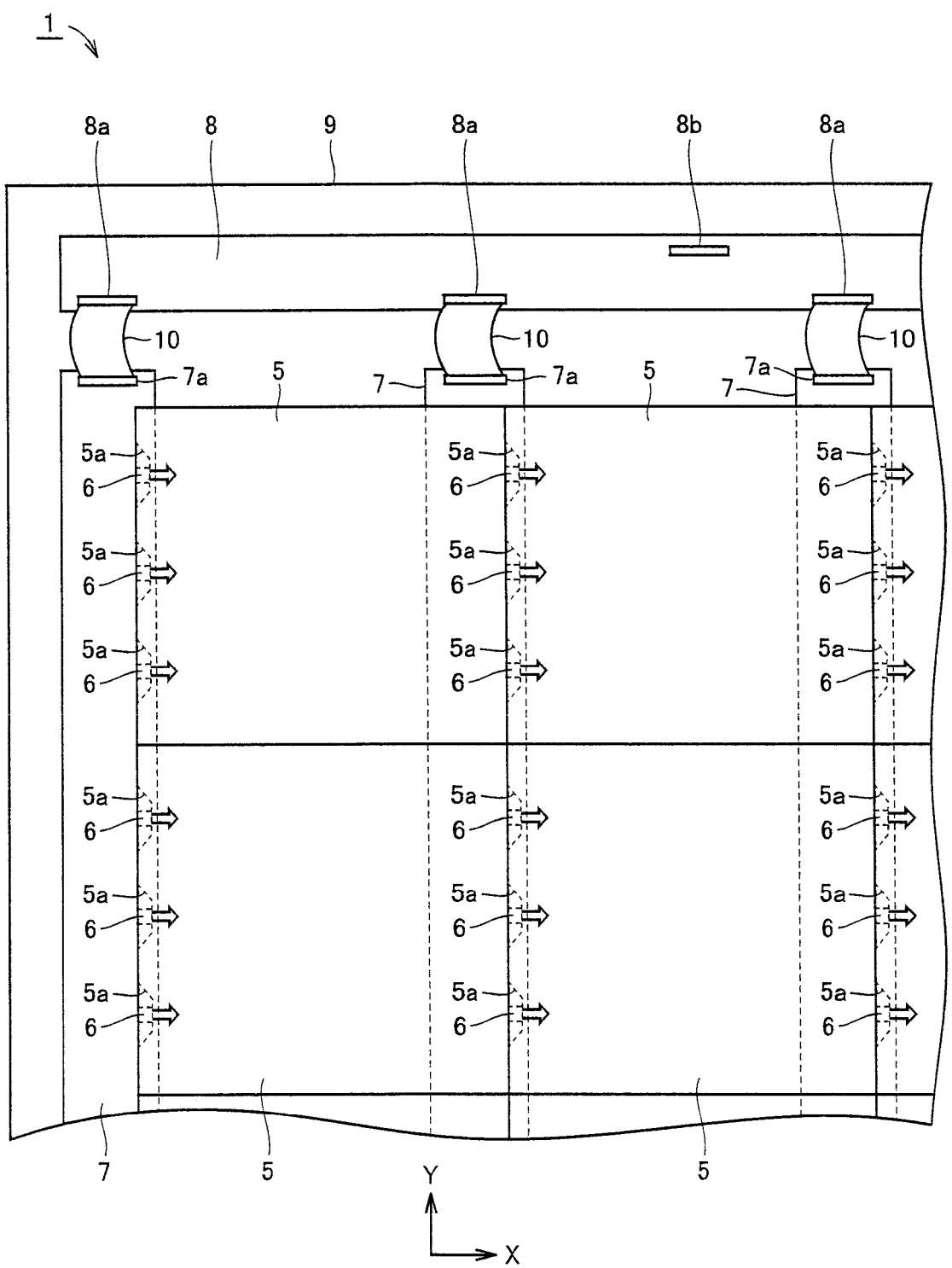
FIG. 2 is a cross-sectional view taken along line II-II in FIG. 1.

FIG. 1 is a cross-sectional view of a main part of a liquid crystal television set according to an embodiment of the present invention, and FIG. 2 is a cross-sectional view taken along line II-II in FIG. 1. In FIGS. 1 and 2, this liquid crystal television set includes a backlight 1, a diffusion sheet 2, a lens sheet 3, and a transmission-type liquid crystal panel 4 which are arranged in this order in a Z direction in FIG. 1. The light emitted from backlight 1 is uniformly diffused by diffusion sheet 2, directed by lens sheet 3 in the Z direction (the direction toward the viewer), and applied to liquid crystal panel 4.

Liquid crystal panel 4 includes a plurality of liquid crystal elements arranged in an X direction (horizontal direction) and in a Y direction (vertical direction) in FIGS. 1 and 2. Each of the liquid crystal elements forms a pixel. The light transmittance of each of the plurality of liquid crystal elements is controlled in accordance with an image signal. When the transmissive light is applied from backlight 1 through diffusion sheet 2 and lens sheet 3 to liquid crystal panel 4, the picture images such as those presented in a television program are displayed on the screen of liquid crystal panel 4.

As shown in FIG. 2, backlight 1 includes a plurality of edge-light type light guide plates 5 and a plurality of (three in FIG. 2) LEDs 6 provided corresponding to each of light guide plates 5. The screen of liquid crystal panel 4 is divided into a plurality of (for example, 92) rectangular regions arranged in a plurality of rows and columns. A plurality of light guide plates 5 are provided facing the plurality of rectangular regions, respectively, and arranged in the X direction (row direction) and the Y direction (column direction).

Each of light guide plates 5 is formed in an approximately rectangular shape. A plurality of (three in FIG. 2) recesses 5a are provided at the intersection of the end face on one side (on the left side in FIG. 2) of each of light guide plates 5 and the undersurface thereof (the surface on the side opposite to liquid crystal panel 4). Furthermore, at the intersection of the end face on the other side (on the right side in FIG. 1) of each of light guide plates 5 and the undersurface thereof, a reflection surface 5b facing the surface of light guide plate 5 (the surface on the side of liquid crystal panel 4) and the end face on the one side thereof is provided. A plurality of LEDs 6 are accommodated in a plurality of recesses 5a. The optical axis of each of LEDs 6 is directed in the X direction to cause each of LEDs 6 to emit the light into the corresponding one of light guide plates 5. The light of each of a plurality of LEDs 6 incoming into light guide plate 5 is reflected and diffused by reflection surface 5b and the undersurface of light guide plate 5, and emitted from the entire surface of light guide plate 5.

Furthermore, backlight 1 includes a plurality of Y substrates 7, an X substrate 8 and a chassis 9. A plurality of Y substrates 7 and X substrate 8 are mounted on the surface of chassis 9. Y substrates 7 each are formed in the shape of a strip and are arranged in parallel with the Y direction. A plurality of Y substrates 7 are arranged at a predetermined distance from each other in the X direction. The distance between the center lines of two adjoining Y substrates 7 is set to be approximately the same dimension as the length of light guide plate 5 in the X direction. X substrate 8 is formed in the shape of a strip, disposed in parallel with the X direction, and placed adjacent to one end (the end on the upper side in FIG. 2) of each of a plurality of Y substrates 7.

A plurality of Y substrates 7 are provided corresponding to a plurality of columns, respectively, each of which includes a plurality of light guide plates. The end on one side (the end on the left side in FIG. 2) of each of a plurality of light guide plates 5 in each column is fixed on the end on one side (the end on the right side in FIG. 2) of corresponding one of Y substrates 7. The end on the other side (the end on the right side in FIG. 2) of each of a plurality of light guide plates 5 in the same column is fixed on the end on the other side (the end on the left side in FIG. 2) of adjoining Y substrate 7. A plurality of LEDs 6 provided corresponding to each of light guide plates 5 are mounted on the surface of each of Y substrates 7 correspond thereto.

Furthermore, a connector 7a is provided on one end of each of Y substrates 7. A plurality of connectors 8a are provided on the surface of X substrate 8. A plurality of connectors 8a are provided corresponding to connectors 7a of a plurality of Y substrates 7, respectively. Each of connectors 8a is connected to the corresponding one of connectors 7a via a cable 10. Furthermore, a connector 8b is provided on the surface of X substrate 8 and connected to a host substrate (not shown) via a cable.

Figure 3:
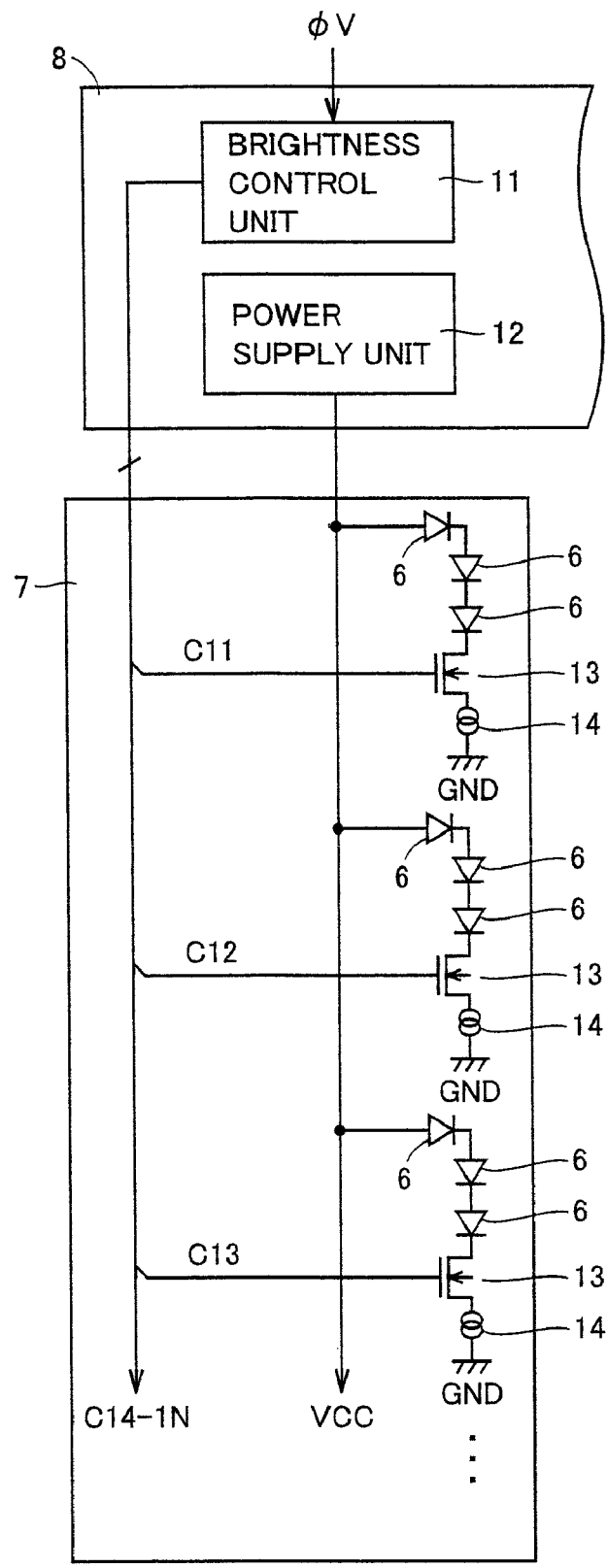
FIG. 3 is a circuit block diagram of the configuration of an X substrate and a Y substrate shown in FIG. 2.

FIG. 3 is a circuit block diagram showing the configuration of X substrate 8 and Y substrate 7, in which a connector and a cable are not shown. In FIG. 3, brightness control unit 11 and a power supply unit 12 are mounted on X substrate 8. The number of light guide plates 5 is assumed to be M in the X direction (M is an integer not less than 2) and assumed to be N in the Y direction (N is an integer not less than 2). Thus, the screen of liquid crystal panel 4 is divided into M×N pieces of rectangular regions.

In accordance with an image signal $\phi V$, brightness control unit 11 obtains a brightness of the image displayed on each of the M×N pieces of rectangular regions, and, based on the obtained brightness of the image displayed on each of the M×N pieces of regions, generates M×N pieces of brightness control signals Cmn (m is an integer from 1 to M, and n is an integer from 1 to N). Each of brightness control signals Cmn is raised to an "H" level by the time period determined in accordance with the brightness of the image displayed on the corresponding one of the rectangular regions. Brightness control signals C11-CMN are supplied to M pieces of Y substrates 7. FIG. 3 shows the state where brightness control signals C11-C1N are supplied to the first Y substrate 7. Power supply unit 12 supplies a power supply voltage VCC to each of Y substrates 7.

Each of Y substrates 7 is provided with three LEDs 6, an N-channel MOS transistor 13 and a constant current circuit 14 corresponding to each of the rectangular regions (that is, each of light guide plates 5). Three LEDs 6, N-channel MOS transistor 13 and constant current circuit 14 are connected in series between the power supply line through which power supply voltage VCC is supplied and the ground line through which a ground voltage GND is supplied.

For example, in the case where the brightness of the image displayed on the first rectangular region is relatively low, the pulse width of brightness control signal C11 (a time period during which the signal is in the "H" level) is set at a short time period t1. In this case, N-channel MOS transistor 13 is brought into conduction by short time period t1, a constant current determined by constant current circuit 14 flows through three LEDs 6, and the brightness of the surface of the first light guide plate 5 is set to a low level.

Furthermore, in the case where the brightness of the image displayed on the second rectangular region is relatively high, the pulse width of brightness control signal C12 (a time period during which the signal is in the "H" level) is set at a long time period t2. In this case, N-channel MOS transistor 13 is brought into conduction by long time period t2, a constant current determined by constant current circuit 14 flows through three LEDs 6, and the brightness of the surface of the second light guide plate 5 is set to a high level. The brightness of each surface of M×N pieces of light guide plates 5 is set separately for each field in the similar way.

In the present embodiment, the screen of liquid crystal panel 4 is divided into a plurality of rectangular regions, edge-light type light guide plate 5 is provided corresponding to each of the rectangular regions, and a plurality of LEDs 6 are provided on the end face of each edge-light type light guide plate 5. The brightness of the image displayed on each of the rectangular regions is obtained based on image signal $\phi V$, and, based on the brightness, the brightness of a plurality of LEDs 6 corresponding to each of the rectangular regions is controlled. Accordingly, since the brightness of liquid crystal panel 4 is controlled for each rectangular region, the power consumption can be reduced as compared with the case where the entire liquid crystal panel 4 is illuminated with uniform brightness. Furthermore, edge-light type light guide plate 5 is used to thereby allow a decrease in number of LEDs 6 and wiring arrangements, and also allow simplification of the device configuration.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A backlight applying transmissive light to a transmission-type liquid crystal panel provided in a liquid crystal display device, a screen of said liquid crystal panel having a plurality of regions, said backlight comprising:

a plurality of light emitting sources provided corresponding to said plurality of regions, respectively;

a plurality of edge-light type light guide plates provided corresponding to said plurality of regions, respectively, each edge-light type light guide plate having a surface facing a corresponding one of the regions, having an end face on which light is incident from a corresponding one of the light emitting sources, and causing the light incident on the end face to emit from the surface;

a brightness control unit for obtaining a brightness of an image displayed on each of the regions based on an image signal and, based on the brightness, controlling a brightness of each of the light emitting sources corresponding to respective regions, wherein:

said plurality of regions are arranged in a plurality of rows and a plurality of columns, said plurality of edge-light type light guide plates are provided corresponding to said plurality of regions, respectively, and arranged in said plurality of rows and said plurality of columns, each of a plurality emitting sources in of the plurality of columns is placed on one side of a corresponding one of the plurality of edge-light type light guide plates; and a plurality of substrates provided corresponding to said plurality of columns, respectively, each substrate having the plurality of light emitting sources on a corresponding one of said plurality of columns;

each region comprises a rectangular shape, each edge-light type light guide plate comprises a rectangular shape, a recess is provided at an intersection of the end face on one side and an undersurface of each edge-light type light guide plate, a reflection surface facing the surface and the end face on the one side of each edge-light type light guide plate is provided at the intersection of an end face on the other side and the undersurface of the edge-light type light guide plate, the reflection surface of each edge-light type light guide plate intersects each of the surface and the undersurface of the edge-light type light guide plate, the plurality of light emitting sources are housed in a plurality of the recesses, respectively, each light emitting source emits light into the corresponding edge-light type light guide plate, and the light of each of the plurality of light emitting sources incoming into the edge-light type light guide plate is reflected and diffused by the undersurface and the reflection surface of the edge-light type light guide plate and emitted from the surface of the edge-light type light guide plate.

* * * * *